(12) United States Patent
Usui

(10) Patent No.: US 6,325,107 B1
(45) Date of Patent: Dec. 4, 2001

(54) METAL PIPELINE HAVING A PROTECTIVE COATING LAYER FOR AN AUTOMOBILE

(75) Inventor: Masayoshi Usui, Numazu (JP)

(73) Assignee: Usui Kokusai Sangyo Kaisha Limited, Shizuoka Prefecture (JP)

( * ) Notice: Subject to any disclaimer, the term of this patent is extended or adjusted under 35 U.S.C. 154(b) by 0 days.

(21) Appl. No.: 09/359,650

(22) Filed: Jul. 26, 1999

Related U.S. Application Data

(63) Continuation of application No. 08/573,546, filed on Dec. 15, 1995, now abandoned.

(30) Foreign Application Priority Data

Dec. 29, 1994 (JP) .................................................. 6-339442

(51) Int. Cl.$^7$ ...................................................... F16L 9/147
(52) U.S. Cl. ........................... 138/146; 138/142; 138/143; 138/171
(58) Field of Search .................................. 138/146, 145, 138/143, 142, 171

(56) References Cited

U.S. PATENT DOCUMENTS

| | | | |
|---|---|---|---|
| 4,568,413 | * 2/1986 | Toth et al. ............................ | 156/151 |
| 4,849,301 | * 7/1989 | Kanasashi ............................ | 428/658 |
| 4,853,297 | 8/1989 | Takahashi et al. . | |
| 4,885,215 | * 12/1989 | Yoshioka et al. ..................... | 138/143 |
| 4,969,980 | 11/1990 | Yoshioka et al. . | |
| 5,059,493 | * 10/1991 | Takahata ............................... | 428/658 |
| 5,490,542 | 2/1996 | Iorio et al. . | |
| 5,520,223 | * 5/1996 | Iorio et al. ............................ | 138/137 |
| 5,556,715 | * 9/1996 | Yoshimi et al. ...................... | 428/623 |
| 5,590,691 | * 1/1997 | Iorio et al. ............................ | 138/137 |
| 5,638,871 | * 6/1997 | Iorio et al. ............................ | 138/137 |
| 5,771,940 | * 6/1998 | Iorio et al. ............................ | 138/137 |
| 5,867,883 | * 2/1999 | Iorio et al. ............................ | 29/460 |

* cited by examiner

Primary Examiner—James Hook
(74) Attorney, Agent, or Firm—Arent Fox Kintner Plotkin & Kahn, PLLC

(57) ABSTRACT

A metal pipeline for use in an automobile having a protective coating layer comprising a metal tube, a zinc-nickel alloy plating layer formed on the outer circumferential surface of the metal tube, a chromate layer formed on the zinc-nickel alloy plating layer and an extrusion molded thermoplastic resin coating layer formed on the chromate layer. A nickel plating layer is formed under the zinc-nickel alloy plating layer. The metal pipeline having the protective coating layer has excellent durability under severe corrosive circumstances including external mechanical forces and also has excellent heat resistance, corrosion resistance and impact shock resistance.

9 Claims, 2 Drawing Sheets

Fig. 3(a)
Fig. 3(b)
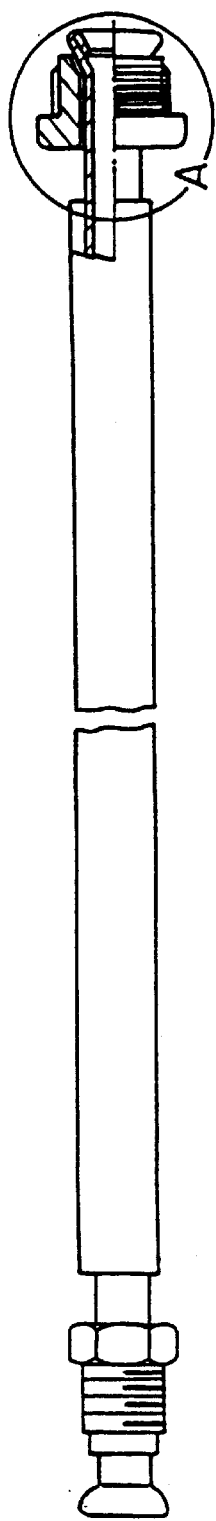
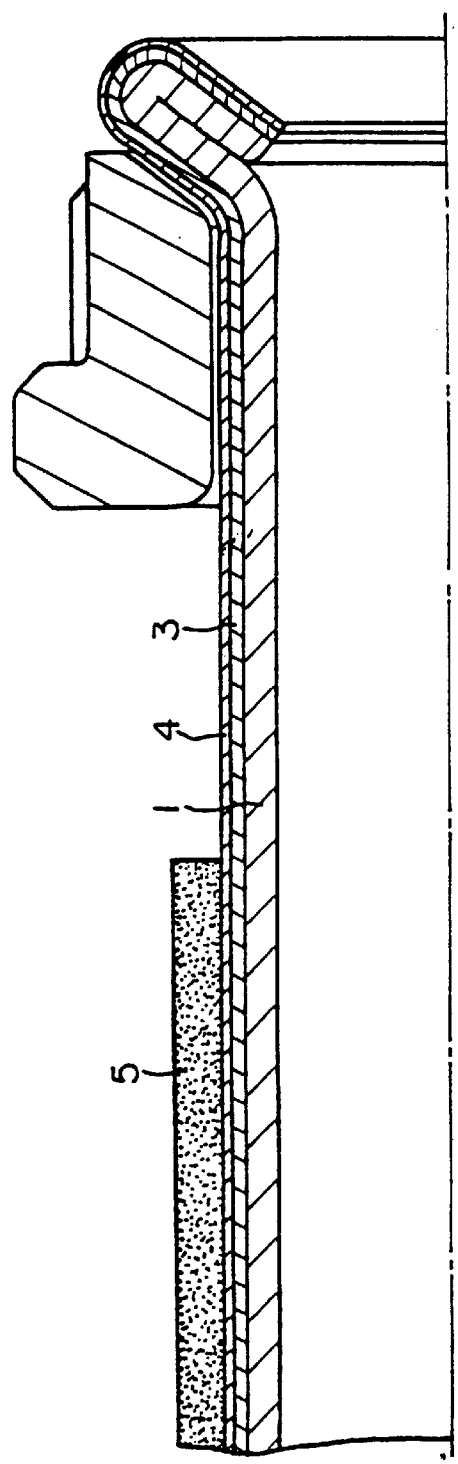

METAL PIPELINE HAVING A PROTECTIVE COATING LAYER FOR AN AUTOMOBILE

This application is a continuation of U.S. Ser. No. 08/573,546, filed Dec. 15, 1995 now abandoned.

BACKGROUND OF THE INVENTION

1. Field of the Invention

The present invention concerns a metal pipeline having a protective coating layer for an automobile, which is excellent in heat resistance, corrosion resistance and impact resistance and used for transportation of fluids such as oils and fuels under severe corrosive circumstances.

2. Description of Prior Arts

For preventing damage to brake oil or fuel oil pipelines of an automobile disposed under the floor of a car body caused by popping pebbles or splashing mud, preventing damage caused by interference between pipelines and other parts in an engine room, or preventing damage caused by interference between tools or parts upon assembling parts, a coated pipe has been known which is manufactured by forming a zinc plating layer on the outer surface of a steel pipe, forming a chromate layer on the zinc plating layer and covering the chromate layer with an extruded thermoplastic resin such as nylon, polyethylene or polypropylene resin.

However, since the resin is extruded by using an extrusion molding machine upon coating an extruded thermoplastic resin, such a coated pipe suffers from a problem that hydrates contained in the chromate layer are evaporated by heating upon molding and the chromate layer shrinks to cause cracking in the layer, so that corrosion resistance is deteriorated remarkably, particularly, to a portion in which a substrate is exposed due to injury of the resin by the popping stones or like, to a portion in which the resin is peeled off for the fabrication of a pipe end or to a portion in which the resin is not covered during intermittent extrusion molding.

SUMMARY OF THE INVENTION

An object of the present invention is to provide a metal pipeline for use in an automobile, which has durability under severe corrosive circumstances including mechanical external forces and is excellent in heat resistance, corrosion resistance and impact resistance.

The present inventor has made earnest studies for overcoming the problem and attaining the foregoing object and, as a result, has accomplished the present invention based on the finding that degradation of the corrosion resistance caused by heating upon extrusion molding of resin coating is reduced, as compared with pipelines of the prior art having a yellow chromate layer applied on the zinc plating layer, by forming a zinc-nickel alloy plating layer on the outer circumferential surface of a metal tube, forming a colorless, yellow, bronze or black chromate layer thereover and, further, forming a nickel plating layer as an underlayer of the zinc-nickel alloy plating layer.

That is, in accordance with a first aspect of the present invention, there is provided a metal pipeline having a protective coating layer for use in an automobile comprising a metal tube, a zinc-nickel alloy plating layer formed on the outer circumferential surface of the metal tube, a chromate layer formed on the zinc-nickel alloy plating layer and an extrusion molded thermoplastic resin coating layer formed on the chromate layer.

Further, in accordance with a second aspect of the present invention, there is provided a metal pipeline having a protective coating layer for use in an automobile comprising a metal tube, a nickel plating layer formed on the outer circumferential surface of the metal tube, a zinc-nickel alloy plating layer formed on the nickel plating layer, a chromate layer formed on the zinc-nickel alloy plating layer and an extrusion molded thermoplastic resin coating layer formed on the chromate layer.

BRIEF DESCRIPTION OF THE DRAWINGS

FIG. 3 is a view showing a state in which a resin coating layer is peeled off for the fabrication of a pipe end in which FIG. 3(a) is a partially cut-away side elevational view and FIG. 3(b) is an enlarged cross sectional view for a portion A in FIG. 3(a).

DETAILED DESCRIPTION OF INVENTION

Figure 1:
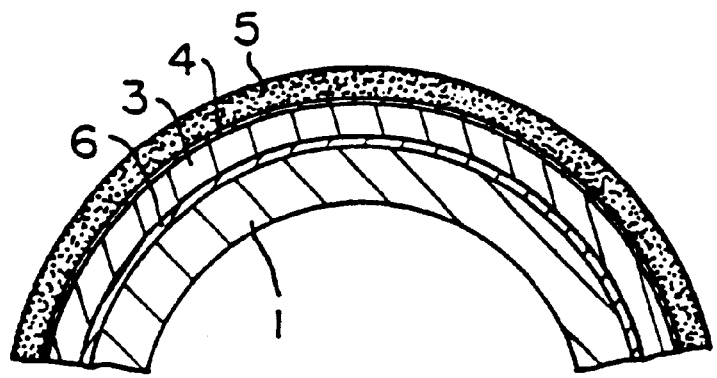
FIG. 1 is a fragmentary cross sectional view of an electric welded pipe in one embodiment according to the present invention.
Figure 2:
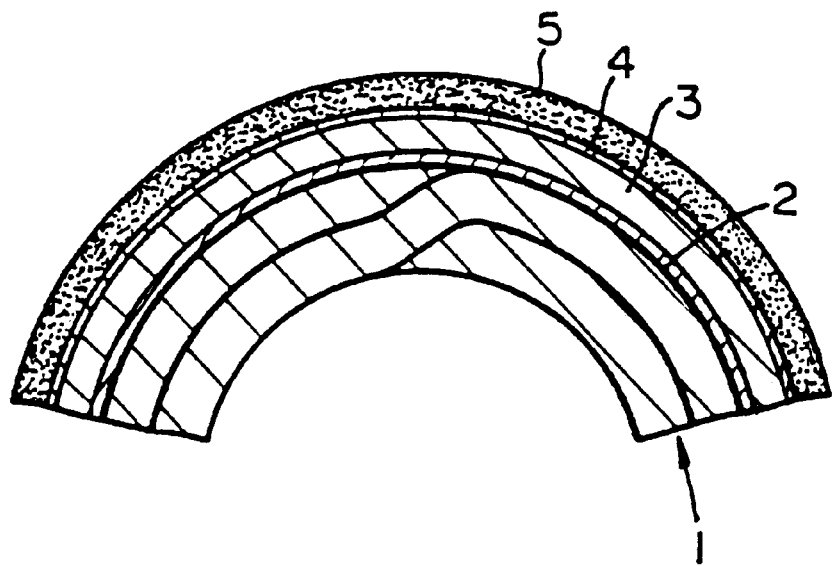
FIG. 2 is a fragmentary cross sectional view of a double wound pipe in another embodiment according to the present invention.

A metal tube used in the present invention is a steel tube of a relatively small diameter such as less than 20 mm of an outer diameter which may be a single wound tube (electric welded tube), a double wound tube or a seamless tube. Further, it may has a copper layer on a surface or a joined face.

A nickel plating layer, a zinc-nickel alloy plating layer or a chromate layer may be formed by an existent method.

Further, a resin coating layer may be formed by an existent extrusion molding process.

The zinc-nickel alloy plating layer formed on the metal tube can be formed by an electric plating process using an acidic bath, for example, ZIN-LOY PROCESS (trade name of products) of Ebara-Udylite Co, Ltd. or an alkaline bath, for example, ANIC PROCESS IZ-260 (trade name of products) of Dipsol Chemicals Co. Ltd. Preferably, the Ni content in the zinc-nickel alloy plating layer is from 5 to 10% and the layer thickness is not more than about 8 $\mu$m in view of the corrosion resistance and the post fabricability.

The chromate layer can be formed on the thus formed zinc-nickel alloy plating layer, that is, various aimed chromate layers can be formed, for example, bright chromate by using an alkaline bath of ANIC PROCESS IZ-266 (trade name of products) of Dipsol Chemicals Co., LTD., yellow chromate by using an acidic bath of EVERCHRO-ZN-81Y (trade name of products) of Ebara-Udylite Co., LTD., or by using an alkaline bath of IZ-268 (trade name of products) of Dipsol Chemicals Co., Ltd., bronze chromate by using an alkaline bath of ANIC PROCESS IZG-263 (trade name of products) of Dipsol Chemiclas Co., Ltd., and black chromate by using an acidic bath of ZN-ATB PROCESS (trade name of products) of Ebara-Udylite Co., Ltd.

Further, the nickel plating layer formed under the zinc-nickel alloy plating layer is preferably treated by using a watt bath so as to obtain a predetermined layer thickness within a range from 0.2 to 10 $\mu$m. This can improve the coverage to the metal tube, the heat resistance and the corrosion resistance, prevent occurrence of peeling or cracking upon pressing and bending fabrication.

The resin coating layer is formed on the zinc-nickel alloy plating layer by a usual extrusion molding process using a thermoplastic synthetic resin, for example, polyethylene (PE), polypropylene (PP), or polyamide (PA). It is preferred that the layer thickness is from 0.8 to 2.0 mm in view of protection for the underlying texture and from an economical point of view.

It is considered that the metal pipeline for use in the automobile according to the present invention thus manufactured has excellent heat resistance, corrosion resistance and impact resistance because the electrodeposited zinc-nickel alloy plating layer has micro-cracks and, therefore, has excellent close bondability with the resin and suffers from less cracking in the layer caused by heating, as compared with the existent pipeline formed by applying the yellow chromate layer to the zinc plating.

Referring then to the present invention based on the drawings, a zinc-nickel alloy plating layer 3 is formed on an outer circumferential surface of a metal tube 1, a chromate layer 4 is applied on the zinc-nickel alloy plating layer 3, and a thermoplastic resin coating layer 5 is formed by extrusion molding on the chromate layer 4. Further, a nickel plating layer 6 may optionally be present between the outer circumferential surface of the metal tube 1 and the zinc-nickel alloy plating layer 3. When the metal pipeline according to the present invention is used, for example, as a pipeline for fuels, it may be used as it is. Then, if it is used as a pipeline for braking oil, the resin coating layer 5 is peeled off at a pipe end and applied with end fabrication such as flare fabrication as shown in FIG. 3 and connected to a mating member by clamping with a fixing nut.

EXAMPLE 1

(1) Small diameter tube (electric welded tube): an electric welded tube 1 of STKM-11A-EC having 8 mm tube diameter and 0.7 mm wall thickness was used as the small diameter tube.

(2) Formation of a zinc-nickel alloy plating layer: after cleaning the pipe described in (1) above by a customary method, it was treated for 20 min by using ANIC PROCESS IZ-260 (trade name of products) of Dipsol Chemicals Co. Ltd., as an alkaline bath, at a bath temperature of 25° C. and with a current density of 5 A/dm2 to form a zinc-nickel alloy plating layer 3 of 8 $\mu$m thickness.

(3) Formation of a chromate layer: a colorless chromate layer 4 was formed on the zinc-nickel alloy plating layer 3 obtained in (2) above by dipping in 10 ml/l of IZ-266 (trade name of products) of Dipsol Chemicals Co., LTD., at a bath temperature of 30° C. for 20 sec.

(4) Formation of a resin coating layer: various kinds of the following resin coating layers 5 were formed on the colorless chromate 4 obtained in (3) above.

(i) A coating layer 5 of low density polyethylene (LDPE) was coated to a layer thickness of 1.0±0.1 mm by using an extruder and extrusion molding at 160° C. (Specimen No. 1).

(ii) A coating layer 5 of high density polyethylene (RDPE) was coated to a layer thickness of 1.0±0.1 mm by using an extruder and extrusion molding at 222° C. (Specimen No. 2).

(iii) A coating layer 5 of polypropylene (PP) was coated to a layer thickness of 1.0±0.1 mm by using an extruder and extrusion molding at 220° C. (Specimen No. 3).

(iv) A coating layer 5 of a polymer alloy comprising PP:HDPE=7:3 was coated to a layer thickness of 1.0±0.1 mm by using an extruder and extrusion molding at 220° C. (Specimen No. 4).

(v) A coating layer 5 of a polymer alloy comprising PP:HDPE=8:2 was coated to a layer thickness of 1.0±0.1 mm by using an extruder and extrusion molding at 220° C. (Specimen No. 5).

(vi) A coating layer 5 of polyamide (PA12) was coated to a layer thickness of 1.0±0.1 mm by using an extruder and extrusion molding at 220° C. (Specimen No. 6).

(5) Corrosion resistance test:

Test 1: Each of the thus obtained specimens was notched to a depth reaching the underlying substrate along a circumferential direction of the small diameter tube at 10 positions each spaced apart by 10 mm pitch by using a cutter knife. A salt spray test according to JIS Z 2371 was conducted to observe occurrence of white rust after 48, 72, 120 and 168 hours. The results are shown in Table 1.

Test 2: Each of the thus obtained specimens was peeled off with the resin coating layer, cut into 250 mm length and a salt spray test according to JIS Z 2371 was conducted in the same manner as above for the corrosion resistance test to observe occurrence of white rust after 48, 72, 120 and 168 hours. The results are shown in Table 1.

EXAMPLE 2

After forming a zinc-nickel alloy plating layer 3 by treating the same small diameter tube 1 as in Example 1-(1) and by the same treatment as in Example 1-(2), a yellow chromate layer 4 was formed on the zinc-nickel alloy plating layer 3 by dipping in 10 ml/l of IZ-268 (trade name of products) of Dipsol Chemicals Co., Ltd., at a bath temperature of 30° C. for 20 sec. Further, resin coating layers 5 were formed in the same procedures as those in Examples 1-(4): (i)–(vi) on the yellow chromate layer 4 to prepare various specimens (Specimen Nos. 7–9).

Corrosion resistance test was conducted in the same manner as in Examples 1-(5) for each of the obtained specimens and the results are shown in Table 1.

EXAMPLE 3

After cleaning the same small diameter tube 1 as in Example 1-(1) by a customary method, a zinc-nickel alloy plating layer 3 was formed to a thickness of 8 $\mu$m by treating in ZIN-LOY PROCESS (trade name of products) of Ebara-Udylite Co., LTD., as an acidic bath at a bath temperature of 35° C. and with a current density of 3 A/dm$^2$ for 15 min. Then, a yellow chromate layer 4 was formed on the zinc-nickel alloy plating layer 3 by dipping in 50 ml/l of EBACHRO-ZN-81Y (trade name of products) of Ebara-Udylite Co., LTD., at a bath temperature of 45° C. for 20 sec. Further, resin coating layers 5 were formed on the yellow chromate layer 4 by treating in the same procedures as those in Example 1-(4): (i)–(vi) to prepare various specimens (Specimen Nos. 10–12). A corrosion resistance test was conducted in the same manner as in Example 1-(5) for each of the thus obtained specimens and the results are shown in Table 1.

EXAMPLE 4

After forming a zinc-nickel alloy plating layer 3 using the same small diameter tube 1 as in Example 1-(1) and by the same treatment as in Example 2, a bronze chromate layer 4 was formed on the zinc-nickel alloy plating layer 3 by dipping in 17 ml/l of IZG-263 (trade name of products) of Dipsol Chemicals Co., Ltd., at a bath temperature of 30° C. for 120 sec.

Further, resin coating layers 5 were formed on the bronze chromate layer 4 by the same treatment as in Example 1-(4): (i)–(vi) to prepare various specimens (Specimen Nos. 13 18). A corrosion resistant test was conducted for each of the thus obtained specimens in the same manner as in Example 1-(5) and the results are shown in Table 1.

EXAMPLE 5

After forming a zinc-nickel alloy plating layer 3 using the same small diameter tube 1 as in Example 1-(1) by the same treatment as in Example 3, a black chromate layer 4 was formed on the zinc-nickel alloy plating layer 3 by using ZN-ATB PROCESS (trade name of products) of Ebara-Udylite Co., Ltd., as an acidic bath. Further, resin coating layers 5 were formed on the black chromate layer 4 by the same treatment as in Example 1-(4): (i)–(vi) to prepare various specimens (Specimen Nos. 10–24). A corrosion resistance test was conducted in the same manner as in Example 1-(5) for each of the thus obtained specimens and the results are shown in Table 1.

obtained in (4) above by the same treatments as those in Example 1-(4): (i)–(vi) to form various resin coating layers 5 (Specimen Nos. 25–30).

(6) Corrosion resistance test: A corrosion resistance test was conducted for each of the obtained specimens in the same manner as in Example 1-(5), and the results are shown in Table 2.

EXAMPLE 7

After forming a nickel plating layer 6 by the same treatment as in Example 6 and forming a zinc-nickel alloy

TABLE 1

| Example | Specimen No. | Layer construction | SST state of formation of white rust | | | | | | | |
|---|---|---|---|---|---|---|---|---|---|---|
| | | | Test 1 | | | | Test 2 | | | |
| | | | 48 Hr | 72 Hr | 120 Hr | 168 Hr | 48 Hr | 12 Hr | 120 Hr | 168 Hr |
| 1 | 1 | Zn/Ni + B.C + ① | ◯ | Δ | Δ | Δ | ◯ | ◯ | ◯ | ◯ |
| | 2 | Zn/Ni + B.C + ② | ◯ | Δ | Δ | Δ | ◯ | ◯ | ◯ | Δ |
| | 3 | Zn/Ni + B.C + ③ | ◯ | Δ | Δ | X | ◯ | ◯ | ◯ | Δ |
| | 4 | Zn/Ni + B.C + ④ | ◯ | Δ | Δ | X | ◯ | ◯ | Δ | Δ |
| | 5 | Zn/Ni + B.C + ⑤ | ◯ | Δ | Δ | X | ◯ | ◯ | Δ | X |
| | 6 | Zn/Ni + B.C + ⑥ | ◯ | ◯ | Δ | Δ | ◯ | ◯ | Δ | Δ |
| 2 | 7 | Zn/Ni + Y.C. + ① | ◯ | Δ | Δ | Δ | ◯ | ◯ | ◯ | ◯ |
| | 8 | Zn/Ni + Y.C. + ② | ◯ | ◯ | Δ | X | ◯ | ◯ | ◯ | ◯ |
| | 9 | Zn/Ni + Y.C. + ③ | ◯ | Δ | Δ | Δ | ◯ | ◯ | ◯ | Δ |
| 3 | 10 | Zn/Ni + Y.C. + ④ | ◯ | Δ | Δ | Δ | ◯ | ◯ | ◯ | Δ |
| | 11 | Zn/Ni + Y.C. + ⑤ | ◯ | ◯ | Δ | X | ◯ | ◯ | ◯ | ◯ |
| | 12 | Zn/Ni + Y.C. + ⑥ | ◯ | ◯ | Δ | Δ | ◯ | ◯ | ◯ | Δ |
| 4 | 13 | Zn/Ni + Br.C. + ① | ◯ | Δ | Δ | ◯ | ◯ | ◯ | ◯ | ◯ |
| | 14 | Zn/Ni + Br.C. + ② | ◯ | ◯ | Δ | Δ | ◯ | ◯ | ◯ | ◯ |
| | 15 | Zn/Ni + Br.C. + ③ | ◯ | Δ | Δ | Δ | ◯ | ◯ | ◯ | ◯ |
| | 16 | Zn/Ni + Br.C. + ④ | ◯ | ◯ | ◯ | Δ | ◯ | ◯ | ◯ | ◯ |
| | 17 | Zn/Ni + Br.C. + ⑤ | ◯ | ◯ | Δ | Δ | ◯ | ◯ | ◯ | ◯ |
| | 18 | Zn/Ni + Br.C. + ⑥ | ◯ | Δ | Δ | Δ | ◯ | ◯ | ◯ | ◯ |
| 5 | 19 | Zn/Ni + Bl.C. + ① | ◯ | ◯ | Δ | Δ | ◯ | ◯ | Δ | Δ |
| | 20 | Zn/Ni + Bl.C. + ② | ◯ | Δ | Δ | Δ | ◯ | ◯ | ◯ | Δ |
| | 21 | Zn/Ni + Bl.C. + ③ | ◯ | Δ | Δ | ◯ | ◯ | ◯ | ◯ | |
| | 22 | Zn/Ni + Bl.C. + ④ | ◯ | Δ | Δ | X | ◯ | ◯ | ◯ | Δ |
| | 23 | Zn/Ni + Bl.C. + ⑤ | ◯ | ◯ | Δ | Δ | ◯ | ◯ | Δ | Δ |
| | 24 | Zn/Ni + Bl.C. + ⑥ | ◯ | Δ | Δ | X | ◯ | ◯ | ◯ | ◯ |

Evaluation standard
◯ no abnormality
Δ A white rust formed
X great amount of white rust formed (to such an extent as adjacent knife cuts are joined)

◯ no abnormality
◯ discoloration of chromate
Δ white rust formed
X more than 5% white rust In Table 1 described above and Table 2 and Table 3 to be described later, are indicated colorless chromate by B.C., yellow chromate by Y.C., bronze chromate by Br.C., black chromate by Bl.C., PE (LDPE) by (1), PE (HDPE) by (2), PP by (3), polymer alloy PP:PE (HDPE)=7:3 ratio by (4), polymer alloy at PP:PE (HDPE)=8:3 ratio by (5) and PA by (6).

EXAMPLE 6

(1) Small diameter tube (electric welded tube): the same electric welded tube as in Example 1 was used.

(2) Formation of nickel a plating layer: nickel plating layer 6 of 2 μm thickness was formed by using a watt bath at a bath temperature of 55° C. and with a current density of 3 A/dm².

(3) Formation of a zinc-nickel alloy plating layer: formed by the same treatment as in Example 1-(2).

(4) Formation of a chromate layer: a colorless chromate layer 4 was formed on the zinc-nickel alloy plating layer 3 by the same treatment as in Example 1-(3).

(5) Formation of a resin coating layer: various resin coating layers 5 were formed on the color chromate layer 4 plating layer 3 on the nickel plating layer 6 by the same treatment as in Example 1-(2), a yellow chromate layer 4 was formed on the zinc-nickel alloy plating layer 3 by the same treatment as in Example 2. Further, resin coating layers 5 were formed on the yellow chromate layer 4 by the same treatment as in Example 1-(4): (i)–(vi) to prepare various specimens (Specimen Nos. 31–36). A corrosion resistance test was conducted for each of the obtained specimens in the same manner as in Example 1-(5) and the results are shown in Table 2.

EXAMPLE 8

After forming a nickel plating layer 6 by using the same small diameter tube 1 as in Example 1-(1) and by the same treatment as in Example 6, and forming a zinc-nickel alloy plating layer 3 on the nickel plating layer 6 by the same treatment as in Example 1-(2), a bronze chromate layer 4 was formed on the zinc-nickel alloy plating layer 3 in the same treatment as in Example 4. Further, resin coating layers 5 were formed on the bronze chromate layer 4 by the same treatment as in Example 1-(4): (i)–(vi) to prepare various specimens (Specimen Nos. 37–42). A corrosion resistance test was conducted for each of the obtained specimens in the same manner as in Example 1-(5) and the results are shown in Table 2.

EXAMPLE 9

After forming a nickel plating layer 6 by using the same small diameter tube 1 as in Example 1-(1) by the same treatment as in Example 6-(2) and forming a zinc-nickel alloy plating layer 3 on the nickel plating layer 6 by the same treatment as in Example (3), a black chromate layer 4 was formed on the zinc-nickel alloy plating layer 3 by the same treatment as in Example 5. Further, resin coating layers 5 were formed on the black chromate layer 4 by the same treatment as in Example 1-(4): (i)–(vi) to prepare various specimens (Specimens Nos. 43–48). A corrosion resistance test was conducted for each of the obtained specimens in the same manner as in Example 1-(5) and the results are shown in Table 2.

tubes each of 4.76 mm outer diameter and 0.7 mm thickness by using a steel hoop made of SPCC having copper plating layers 2 each of 3 um thickness formed on both outer surface and rear face. When a corrosion resistance test was conducted for each of them, same satisfactory results as in Examples 6–9 were obtained for each of them.

Comparative Example 1

(1) Small diameter tube (electric welded tube): the same electric welded tube as in Example 1 was used.

(2) Formation of a zinc plating layer: a zinc plating layer of 8 $\mu$m thickness was formed by using a bath comprising 28 g/l of zinc oxide, 50 g/l of sodium cyanate and 80 g/l of sodium hydroxide and treating at a bath temperature of 25° C. and with a current density of 3 A/dm$^2$ for 15 min.

(3) Formation of a chromate layer: a yellow chromate layer was formed on the zinc plating layer obtained in (2)

TABLE 2

| Example | Specimen No. | Layer construction | SST state of formation of white rust | | | | | | | |
|---|---|---|---|---|---|---|---|---|---|---|
| | | | Test 1 | | | | Test 2 | | | |
| | | | 48 Hr | 72 Hr | 120 Hr | 168 Hr | 48 Hr | 12 Hr | 120 Hr | 168 Hr |
| 6 | 25 | Ni + Zn/Ni + B.C. + ① | ○ | ○ | Δ | Δ | ○ | ○ | ○ | Δ |
| | 26 | Ni + Zn/Ni + B.C. + ② | ○ | Δ | Δ | X | ○ | ○ | ○ | Δ |
| | 27 | Ni + Zn/Ni + B.C. + ③ | ○ | Δ | Δ | X | ○ | ○ | Δ | Δ |
| | 28 | Ni + Zn/Ni + B.C. + ④ | ○ | Δ | Δ | Δ | ○ | ○ | Δ | X |
| | 29 | Ni + Zn/Ni + B.C. + ⑤ | ○ | Δ | Δ | X | ○ | ○ | ○ | Δ |
| | 30 | Ni + Zn/Ni + B.C. + ⑥ | ○ | Δ | Δ | Δ | ○ | ○ | Δ | X |
| 7 | 31 | Ni + Zn/Ni + Y.C. + ① | ○ | ○ | Δ | Δ | ○ | ○ | ○ | ○ |
| | 32 | Ni + Zn/Ni + Y.C. + ② | ○ | ○ | Δ | X | ○ | ○ | ○ | ○ |
| | 33 | Ni + Zn/Ni + Y.C. + ③ | ○ | Δ | Δ | Δ | ○ | ○ | ○ | ○ |
| | 34 | Ni + Zn/Ni + Y.C. + ④ | ○ | Δ | Δ | Δ | ○ | ○ | ○ | Δ |
| | 35 | Ni + Zn/Ni + Y.C. + ⑤ | ○ | ○ | ○ | Δ | ○ | ○ | ○ | ○ |
| | 36 | Ni + Zn/Ni + Y.C. + ⑥ | ○ | Δ | Δ | X | ○ | ○ | ○ | ○ |
| 8 | 37 | Ni + Zn/Ni + Br.C. + ① | ○ | ○ | Δ | Δ | ○ | ○ | ○ | ○ |
| | 38 | Ni + Zn/Ni + Br.C. + ② | ○ | Δ | Δ | Δ | ○ | ○ | ○ | ○ |
| | 39 | Ni + Zn/Ni + Br.C. + ③ | ○ | ○ | Δ | Δ | ○ | ○ | ○ | ○ |
| | 40 | Ni + Zn/Ni + Br.C. + ④ | ○ | ○ | Δ | Δ | ○ | ○ | ○ | ○ |
| | 41 | Ni + Zn/Ni + Br.C. + ⑤ | ○ | ○ | ○ | Δ | ○ | ○ | ○ | ○ |
| | 42 | Ni + Zn/Ni + Br.C. + ⑥ | ○ | Δ | Δ | Δ | ○ | ○ | ○ | ○ |
| 9 | 43 | Ni + Zn/Ni + Bl.C. + ① | ○ | Δ | Δ | Δ | ○ | ○ | ○ | ○ |
| | 44 | Ni + Zn/Ni + Bl.C. + ② | ○ | Δ | Δ | Δ | ○ | ○ | ○ | Δ |
| | 45 | Ni + Zn/Ni + Bl.C. + ③ | ○ | Δ | Δ | Δ | ○ | ○ | ○ | Δ |
| | 46 | Ni + Zn/Ni + Bl.C. + ④ | ○ | Δ | Δ | X | ○ | ○ | Δ | X |
| | 47 | Ni + Zn/Ni + Bl.C. + ⑤ | ○ | Δ | Δ | X | ○ | ○ | ○ | Δ |
| | 48 | Ni + Zn/Ni + Bl.C. + ⑥ | ○ | ○ | Δ | Δ | ○ | ○ | ○ | ○ |

Evaluation standard  
○ no abnormality  
Δ A white rust formed  
X great amount of white rust formed (to such an extent as adjacent knife cuts are joined)  
○ no abnormality  
○ discoloration of chromate  
Δ white rust formed  
X more than 5% white rust

EXAMPLE 10

Various specimens were obtained by the same treatment as in Examples 1–5 except for manufacturing double wound tubes each of 4.76 mm outer diameter and 0.7 mm thickness by using a steel hoop made of SPCC having copper plating layers 2 each of 3 um thickness formed on both outer surface and rear face. When a corrosion resistance test was conducted for each of them, same satisfactory results as in Examples 1–5 were obtained for each of them.

EXAMPLE 11

Various specimens were obtained by the same treatment as in Examples 6–9 except for manufacturing double wound above by using ROWMATE 62S (trade name of products) manufactured by JASCO Chemicals Co. Ltd.

(4) Formation of a resin coating layer: Various resin coating layers were formed on the yellow chromate layer obtained in (3) above by the same treatment as in Example 2 (Specimen Nos. 48–54).

(5) Corrosion resistance test: a corrosion resistance test was conductor for each of the thus obtained specimens in the same manner as in Example 1-5). and the results are shown in Table 3.

TABLE 3

| Example | Specimen No. | Layer construction | SST state of formation of white rust | | | | | | | |
|---|---|---|---|---|---|---|---|---|---|---|
| | | | Test 1 | | | | Test 2 | | | |
| | | | 48 Hr | 72 Hr | 120 Hr | 168 Hr | 48 Hr | 12 Hr | 120 Hr | 168 Hr |
| 1 | 1 | Zn plating + Y.C. + ① | Δ | X | X | X | ○ | Δ | X | X |
| | 2 | Zn plating + Y.C. + ② | Δ | X | X | X | Δ | X | X | X |
| | 3 | Zn plating + Y.C. + ③ | Δ | X | X | X | Δ | X | X | X |
| | 4 | Zn plating + Y.C. + ④ | Δ | Δ | X | X | Δ | X | X | X |
| | 5 | Zn plating + Y.C. + ⑤ | Δ | X | X | X | Δ | X | X | X |
| | 6 | Zn plating + Y.C. + ⑥ | Δ | X | X | X | Δ | Δ | X | |

| Evaluation standard | | |
|---|---|---|
| ○ | no abnormality | |
| Δ | A white rust formed | |
| X | great amount of white rust formed (to such an extent as adjacent knife cuts are joined) | |
| ○ | no abnormality | |
| | discoloration of chromate | |
| Δ | white rust formed | |
| X | more than 5% white rust | |

Comparative Example 2

The same treatment as in Comparative Example 1 was applied except for using a double wound tube manufactured in the same manner as in Example 10. When the same corrosion resistance Lest as in Example 1-(5) was conducted to each of the obtained specimens, only the same results as those in Comparative Example 1 could be obtained.

As has been described above, in accordance with the present invention, since the metal pipeline for use in an automobile comprises metal tube—(zinc-nickel alloy plating layer)—chromate layer—resin coating layer, or metal tube—nickel plating layer—(zinc-nickel alloy plating layer)—resin coating layer in this order, it has excellent durability under severe corrosive circumstances including external mechanical forces, has excellent heat resistance, corrosion resistance and impact resistance, and,further, excellent close bondability with the resin as compared with the existent zinc plating—chromate layer—resin coating. In addition, if the underlying substrate is exposed upon injury of the resin coating layer caused by popping stone or the like or when the resin coating layer is peeled off by the fabrication for the tube and excellent heat resistance and corrosion resistance are provided on the exposed surface.

What is claimed is:

1. A metal pipeline for use in an automobile having a metal tube with a protective coating layer, said protective coating layer consisting of a nickel plating layer formed on both an outer and an inner circumferential surface of the metal tube, a zinc-nickel alloy plating layer formed on the nickel plating layer, a chromate layer formed on the zinc-nickel alloy plating layer, and a single extrusion molded thermoplastic resin coating layer formed on the chromate layer, wherein said single thermoplastic resin layer comprises a thermoplastic synthetic resin selected from the group consisting of polypropylene and polyethylene and has a thickness of from 0.8 to 2.0 mm and wherein said nickel plating layer has a thickness of 0.2 to 10 μm.

2. A metal pipeline for use in an automobile having a protective coating layer as defined in claim 1, wherein the metal tube is a single wound tube (electric welded tube), a double wound tube or a seamless tube.

3. A metal pipeline for use in an automobile having a protective coating layer as defined in claim 2, wherein the metal tube is a double wound tube having an outer peripheral surface, an inner peripheral surface and a joined face between the outer peripheral surface and the inner peripheral surface, wherein a copper layer is formed on the outer peripheral surface, the inner peripheral surface and the joined face.

4. A metal pipeline for use in an automobile having a protective coating layer as defined in claim 1, wherein the thickness of the zinc-nickel alloy plating layer is in a range of from 2 μm to 8 μm.

5. A metal pipeline for use in an automobile having a protective coating layer as defined in claim 1, wherein the resin coating layer comprises a thermoplastic synthetic resin.

6. A metal pipeline for use in an automobile having a protective coating layer as defined in claim 5, wherein the thermoplastic synthetic resin comprises polyethylene, polypropylene or polyamide.

7. A metal pipeline for use in an automobile having a protective coating layer as defined in claim 1 wherein the thickness of the resin coating layer is from 0.8 to 2.0 mm.

8. A metal pipeline for use in an automobile having a protective coating layer as defined in claim 1, wherein the thickness of the nickel plating layer is within a range from 0.2 to 10 μm.

9. A metal pipeline for use in an automobile having a protective coating layer as defined in claim 1, wherein the metal tube is a steel tube.

* * * * *